United States Patent [19]

Mueller et al.

[11] Patent Number: 4,550,250
[45] Date of Patent: Oct. 29, 1985

[54] CORDLESS DIGITAL GRAPHICS INPUT DEVICE

[75] Inventors: Wayne A. Mueller, Mound; Scott D. Schuette, Loretto, both of Minn.

[73] Assignee: HEI, Inc., Victoria, Minn.

[21] Appl. No.: 551,147

[22] Filed: Nov. 14, 1983

[51] Int. Cl.⁴ .............................................. G08C 21/00
[52] U.S. Cl. .................. 250/203 R; 250/221; 250/237 R; 178/18; 340/710; 356/375
[58] Field of Search ................ 250/203 R, 203 S, 221, 250/237 R; 340/701–703, 707–711; 356/141, 147, 152, 375; 178/18

[56] References Cited

U.S. PATENT DOCUMENTS

| | | | |
|---|---|---|---|
| 3,128,340 | 4/1964 | Harmon | 178/18 |
| 3,602,903 | 8/1971 | Requa | 356/152 |
| 3,626,483 | 12/1971 | Whetstone | 178/18 |
| 3,790,709 | 2/1974 | Heywang | 178/18 |
| 3,857,022 | 12/1974 | Rebane et al. | 178/18 |
| 3,886,311 | 5/1975 | Rodgers et al. | 178/18 |
| 3,901,604 | 8/1975 | Butler | 356/152 |
| 3,911,215 | 10/1975 | Hurst et al. | 178/18 |
| 3,951,550 | 4/1976 | Slick | 356/141 |
| 4,012,588 | 3/1977 | Davis et al. | 178/18 |
| 4,018,532 | 4/1977 | Fletcher et al. | 356/141 |
| 4,078,151 | 3/1978 | McNeary | 178/18 |
| 4,092,072 | 5/1978 | Ellis | 356/141 |
| 4,209,254 | 6/1980 | Reymond et al. | 356/152 |
| 4,295,740 | 10/1981 | Sturges, Jr. | 250/203 |
| 4,317,992 | 3/1982 | Stauffer | 250/221 |

Primary Examiner—Edward P. Westin
Attorney, Agent, or Firm—Orrin M. Haugen; Thomas J. Nikolai

[57] ABSTRACT

A cordless graphics input device system for use with a computer. The device comprises an infrared emitting module useable on any surface adjacent a detector having a pair of patterned concave sensors. Coordinate information is determined via a detector contained microprocessor relative to the sensed analog position data.

13 Claims, 12 Drawing Figures

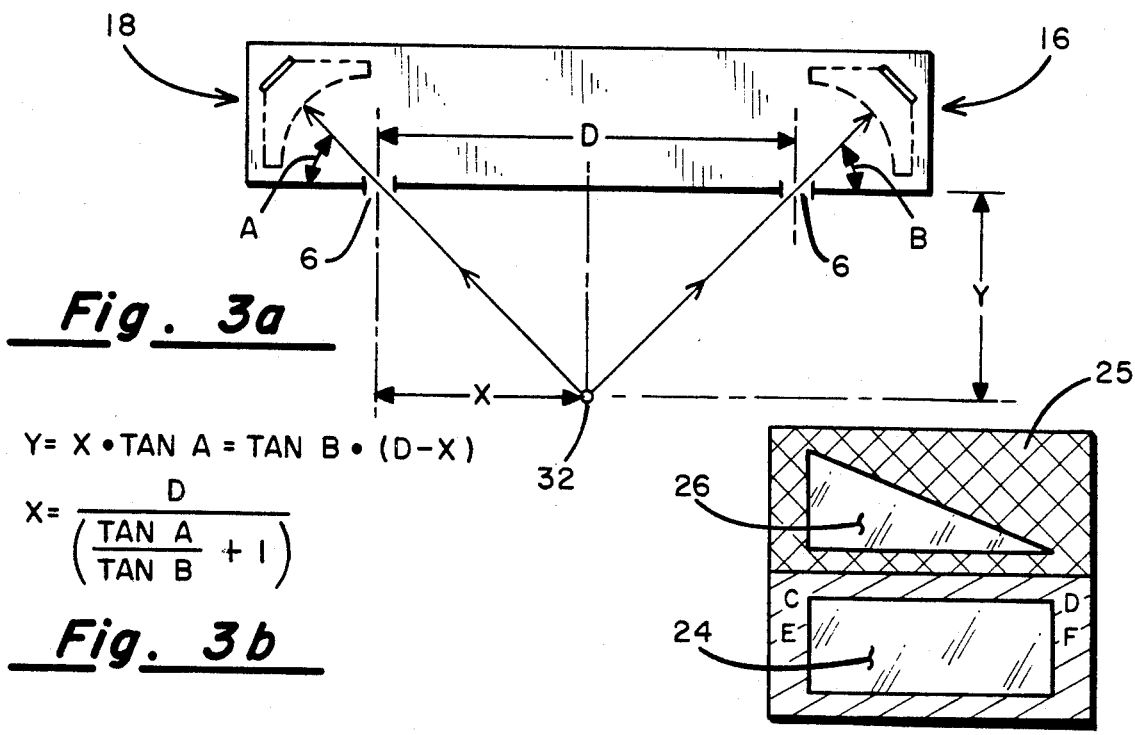
*Fig. 3a*
$Y = X \cdot \tan A = \tan B \cdot (D-X)$
$X = \dfrac{D}{\left(\dfrac{\tan A}{\tan B} + 1\right)}$
*Fig. 3b*
*Fig. 3c*
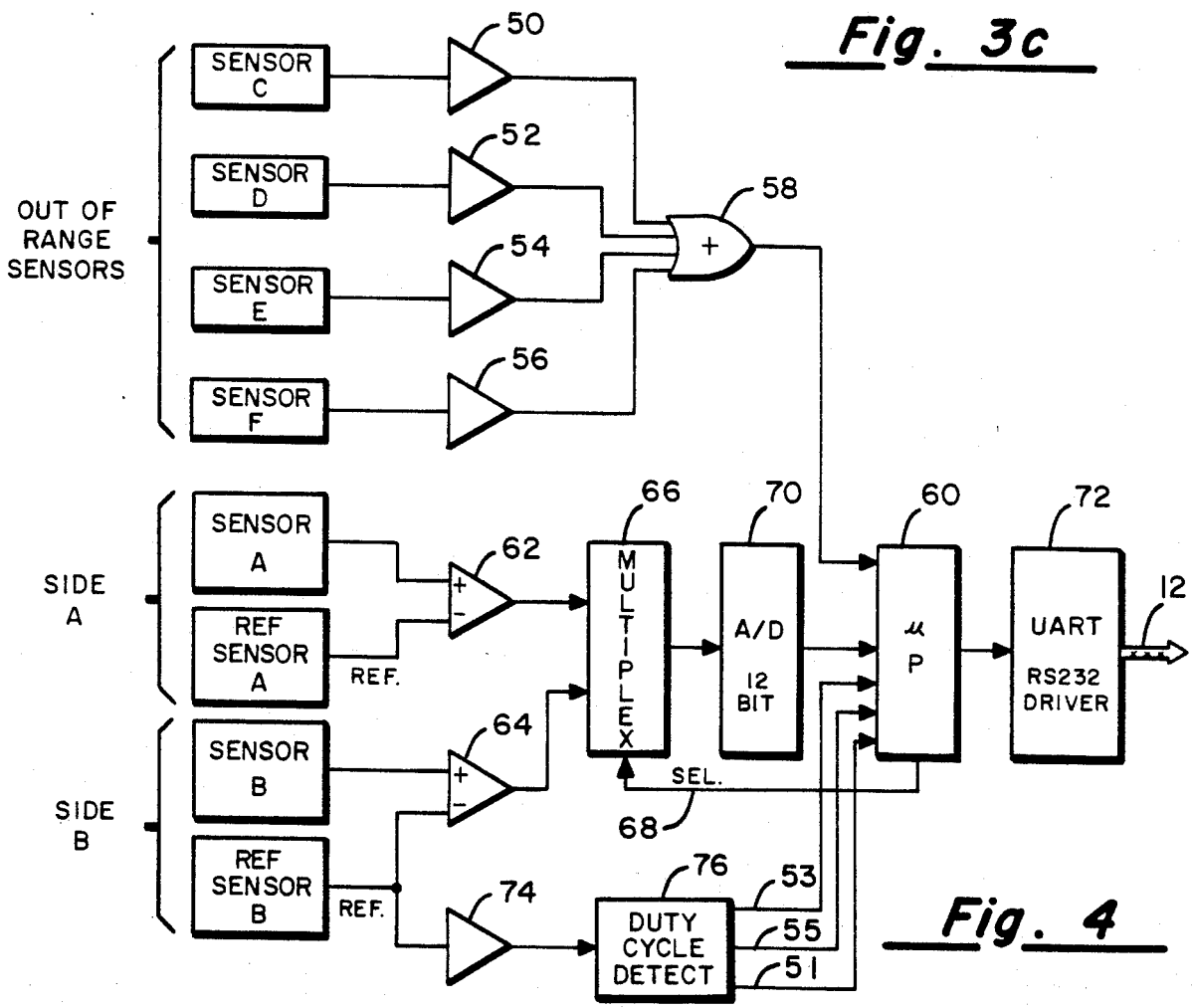
*Fig. 4*

CORDLESS DIGITAL GRAPHICS INPUT DEVICE

BACKGROUND OF THE INVENTION

The present invention relates to a positional data input device for a computer and, in particular, to a cordless graphics input device which when used in conjunction with a photo-optic detector and processor, determines the Cartesian coordinate location of the cordless device.

Heretofore, a variety of computer data entry devices have existed. For example, light pens, joy sticks track balls, and capacitively interconnected screens and pens, are known in the art and which permit an operator to couple positional or coordinate related data to a computer. Such devices, however, are dependent upon an interconnected cord or electrical connection between the hand held position indicating device and the reference plane. Examples of some of such devices can be found upon reference to U.S. Pat. Nos. 3,886,311; 3,857,002; 3,790,709; and 3,626,483.

Digital cursor positioning devices of the type colloquially referred to as digital "mice", on the other hand, are of a recent innovation to computer display systems. Generally, they comprise a hand-held device which, when moved about a specially constructed pad, generates signals that are fed through a cord to control the positioning of a cursor on a CRT display screen. Thus, upon calibrating the mouse or graphics input device (GID) to the surface upon which it rests, the GID, via its on-board circuitry, sends positional data to the computer which then appropriately responds in the manner dependent upon its programmed mode of operation relative to the GID's movement. Manually generated commands to the computer may also be determined by one or more switches disposed on the GID, the state of the switches being sensed by the associated computer.

The prior art computer graphics input devices thus require a direct electrical connection to the computer by a cord. In addition certain types of the prior art GID's depend upon movement upon a special surface, such as a membrane switch array or a printed circuit grid. The necessities of such an interconnecting cord and prepared surface, however, place undue restraints on the use of the GID. In particular, failure to maintain physical contact between the GID and special surface may result in the loss of calibration, if the GID is lifted therefrom. Also, the cord tying the GID to the computer does not provide for free and easy movement, since it trails behind and can get in the way.

While another type of GID has been developed with a housing having a "track-ball" on its undersurface that cooperates with rotary switches to provide positional data, the housing must be held in a predetermined orientation or otherwise the resulting cursor movement will be at an angle with respect to a X-Y coordinate system. Thus, this type of device oftentimes produces operator fatigue.

It is, accordingly, a primary object of the present invention to provide a computer graphics input device that is not mechanically attached to the computer and which does not require continuous operation upon a special surface or in a peculiar orientation. The cordless graphics input device of the present invention may therefore be moved about upon any convenient planar surface relative to an associated stationary, computer coupled detector module. Thus, the GID may be moved at will, independent of any cords, provided a resonably flat surface is available for supporting the detector module and movable GID. Also, the present GID need not be held in any special way to avoid diagonal cursor movement on the display screen.

In lieu of a direct electrical interconnection to the computer via a cable, the present invention, utilizes a photo-optic system wherein a freely movable light source may be moved relative to a stationary detector module (containing appropriate detecting and processing devices) whereby coordinate related position data is generated for use by the computer.

In particular, the present invention comprises a digital, hand-held mouse in which a pulsatile point light source is appropriately generated and transmitted omnidirectionally. A fraction of the light is allowed to pass through spaced-apart, verticle slits and impinge upon a pair of concave sensors in the detector modules which have appropriately patterned areas thereon for creating positionally sensitive, weighted analog signals. The analog signals are, in turn, in a real time fashion, converted to a digital format which is acted upon by the associated computer to perform functions which depend upon the computer's operating software and the state of manual switch contacts selected at the mouse.

The above-mentioned objects, advantages and distinctions of the present invention, as well as various others will, however, become more apparent upon reference to the following description thereof relative to the following drawings. Before referring thereto, however, it is to be recognized that the following description is made with respect to the presently preferred embodiment only and, accordingly, various modifications may be made thereto without departing from the spirit and scope of the invention. Some of such changes will be mentioned hereinafter, but it is to be recognized that still others may be suggested to those of skill in the art.

BRIEF DESCRIPTION OF THE DRAWINGS

FIG. 3a shows a top view of the present system and a geometrical representation of the position sensitive parameters;

FIG. 3b shows the equations from which the position coordinates are determined;

FIG. 3c shows a view of the sensor patterns and associated out-of-range sensors;

FIG. 4 shows a generalized schematic diagram of the control circuitry contained within the stationary detector module of the present invention;

SUMMARY OF THE INVENTION

A cordless, movable, digital graphics input device having a pulse-driven light source whose duty cycle is controlled for conveying information. The GID can be used on any surface in proximity to a light (infrared) detector and which detector senses the X, Y caps position of the GID and determines the corresponding Cartesian coordinates for use by an associated computer. Depending, too, upon the operating mode of the computer, the coordinate information may be used in a variety of ways.

The detector comprises a housing having two spaced-apart optical slits formed therein for passing planes of infrared light onto associated spaced-apart, concave, light guides. These light guides have a pattern of transparent windows bounded by opaque boarders formed thereon and are used with photoelectric sensors for producing an analog reference signal and a positionally dependent analog signal. The analog signals are, in turn, digitally processed in the detector so as to in a real-time fashion determine the Cartesian coordinates of the GID relative to the detector. The GID may be used on any flat surface and be operated in any fashion so long as its infrared light impinges upon the detector; there being no requirement for a special pad of any type or of a cord to join the GID to the detector or computer.

DESCRIPTION OF THE PREFERRED EMBODIMENT

Figure 1:
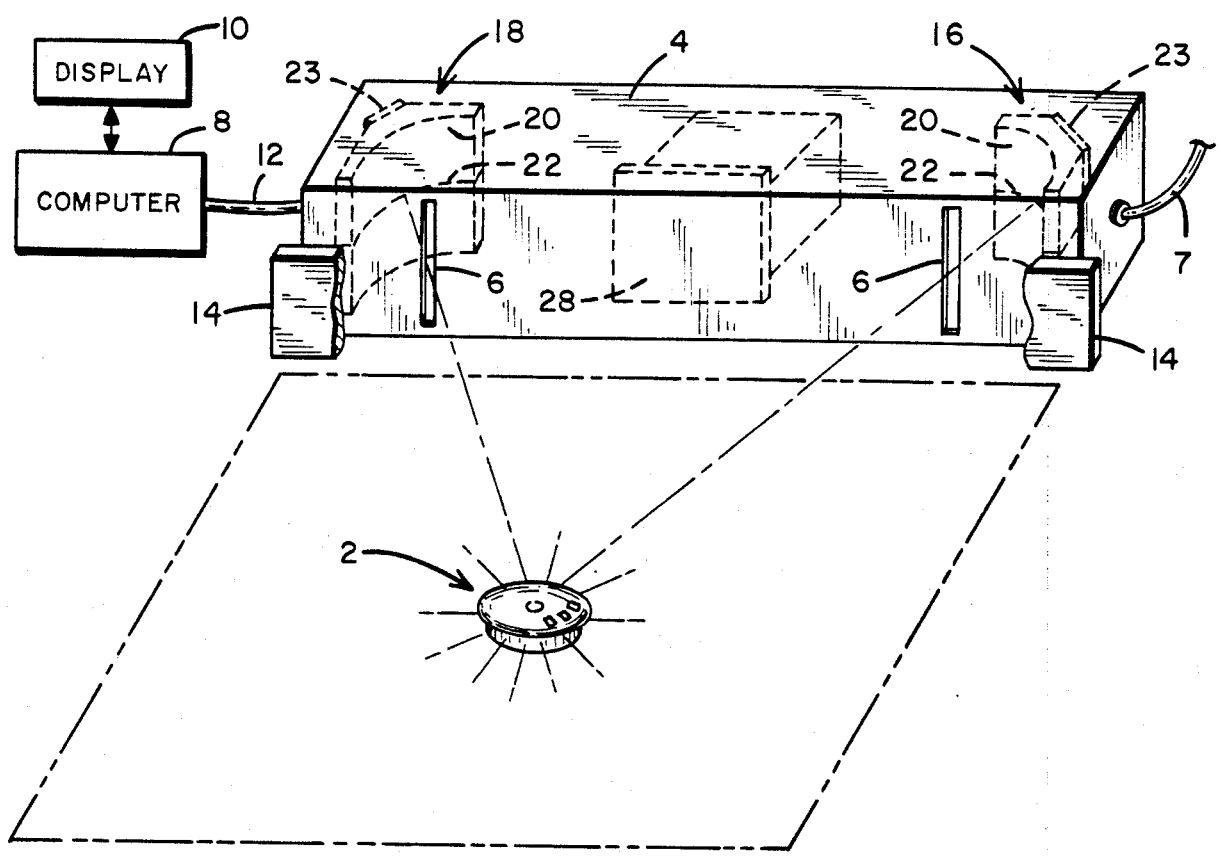
FIG. 1 shows a perspective view of the present system and the relative positioning of its associated components.

Referring to FIG. 1, a perspective view is shown of the present movable GID 2 containing a light source in operative relationship to a stationary detector module 4. Both the GID 2 and detector module 4 are disposed on a flat surface (e.g. a table top) such that the light radiating from the GID 2 impinges upon the vertical optical slits 6 formed in the face of the detector 4.

Boundary or movement limits are shown by phantom lines surrounding the GID 2. In the embodiment of FIG. 1, the boundaries comprise a square whose dimensions are eight inches by eight inches, the square being spaced approximately four inches forward of the vertical front surface of the elongated detector module 4. It is within this square space, then, that the detector 4 is capable of validly sensing the light emanating from the GID 2 and determining the Cartesian coordinates of the GID 2. Data representing these coordinates is, in turn, coupled to the computer 8 and/or a digital display 10 so as to translate the movement of the GID 2 into an appropriate activity in the computer 8 or relative to the display 10. For instance, among other uses, the GID 2 may be used in conjunction with the computer games to reflect movement of an object on a CRT screen or in conjunction with computer assisted design (CAD) activities for calling up or changing related design data that is displayed on a screen. It should be noted, too, that while in the preferred embodiment the detector 4 responds to GID movement in an eight inch by eight inch square, the resolution relative to the GID mouse movement may be increased or decreased and/or the area of use expanded via the use of a longer detector and/or increasing the number of bits used to define GID position.

Directing closer attention to the detector 4, it is also to be noted that it is supplied from an AC power supply (not shown) via power cord 7 and is coupled to the computer 8 and/or display 10 via an associated output cable 12. Typically, an RS 232, ASCII code is transmitted, over cable 12, although, it is to be recognized that various other codes may be employed, depending upon the interface that is used in conjunction with the computer 8. Mounted over the front face of the housing of the detector module 4 is a visually opaque but infrared transparent screen 14. The screen serves to preclude dust, etcetera from entering the housing. The detector module 4 may also contain various switches (not shown) for selecting one or more interfaces and/or appropriately switching the detector outputs to one or more devices to which the detector 4 is coupled.

Behind the screen 14 are a pair of vertically oriented optical slits 6 that are disposed near opposed ends of the elongated detector housing. The slits are approximately 0.050 inches wide and extend the full height (i.e. three inches) of the housing. Mounted within the housing and behind the slits 6 are individual right and left light guide/sensors 16 and 18. Each guide/sensor 16 and 18 is fabricated from a split block of infrared transparent material that extends the full height of the detector housing and each of which blocks of material function as a light guide 20. A concave face is also formed on one surface of each light guide 20 and an infrared opaque horizontal divider 22 is placed between the block haves so as to divide the face of each light guide 20 into two superposed vertical halves. Vertically and centrally mounted behind each of the light guides 20 then are associated charge coupled device (CCD) light sensors 23 that produce analog outputs indicative of GID position, and which outputs vary with the intensity of the light reaching the sensors 23.

The intensity of the light impinging on the sensors 23 is controlled via a pair of infrared patterned transparent windows 24 and 26 that are formed in a mask 25, overlying concave face of the respective halves of each light guide 20. In particular, the concave faces of the light guides 20 are masked with an infrared opaque mask 25 except in the area of patterned windows 24 and 26 and which are left exposed so as to selectively pass light impinging thereon. The window 24 on the bottom half of each guide/sensor 16 and 18 is formed in a rectangular shape; while the window 26 on the upper half is formed on a right triangular shape. Thus, as a vertical plane of light from the GID 2 enters through the slits 6 and impinges upon the guides 20, a constant analog reference signal is produced via the windows 24, while a positionally dependent and intensity varying analog signal is produced via the window 26. (The magnitude of the analog signal at window 26 varying with whether the light impinges at the narrow or wide regions of the triangular window 26.) At this point, it is to be recognized, too, that while the embodiment being described utilizes a lower rectangular window as a reference and an upper triangular shaped window as a means for creating a light position dependent analog signal, various other window shapes and positions will also work.

Figure 2A:
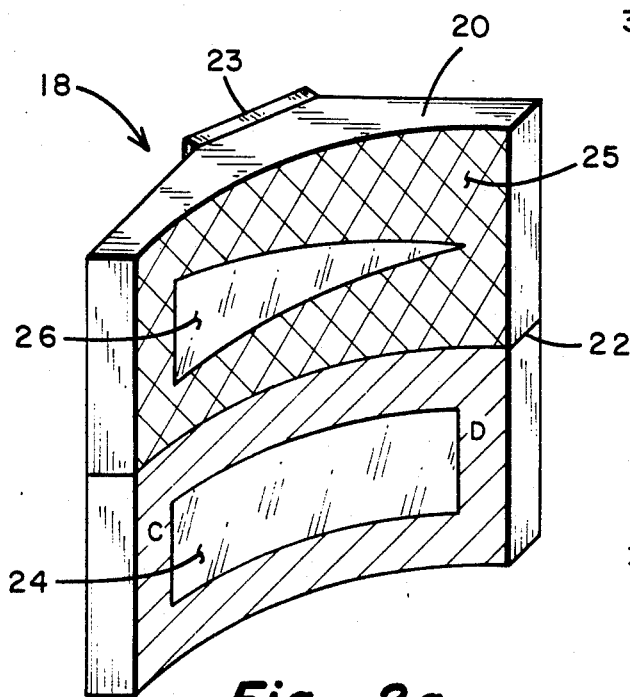
FIG. 2a shows a perspective view of one of the concave sensors and its patterned window.

A better view of the relative shapes and position of the structures of the guide/sensors 16 and 18 can also be had from FIG. 2a. There the left guide/sensor 18 is shown in detail relative to the above-mentioned transparent windows 24 and 26 and opaque mask 25. From FIG. 2a, it is also to be noted that imaginary right and left boundaries, labled D and C, are established for the left detector 18; while corresponding right and left boundaries F and E (not shown) are established for the right detector 16. It is these boundaries C, D, E and F that correlate with the X axis, regional boundaries within which the GID 2 may be moved and generate valid position data. The Y axis boundaries, on the other hand, are not shown because they mathematically depend upon the X axis bounds, due to the geometry involved, but this will become more apparent hereinafter when FIG. 3a is considered. In passing and redirecting attention to FIG. 1, it is to be noted further that the conversion logic and processing circuitry necessary for translating the analog data from the CCD sensors 23 into the corresponding digital Cartesian coordinates is contained in the detector module 4 on the printed circuit board 28. This circuitry will be, however, also discussed in greater detail hereinafter.

Figure 2B:
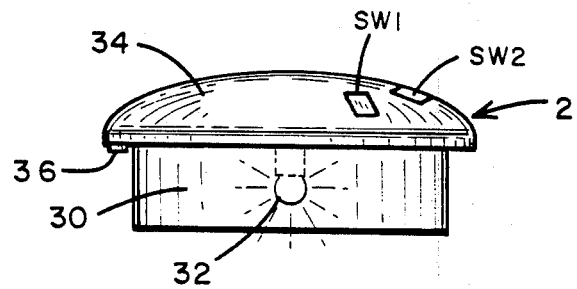
FIGS. 2b and 2c respectively show an elevation and a perspective view of the cordless mouse in accordance with the present invention.
Figure 2C:
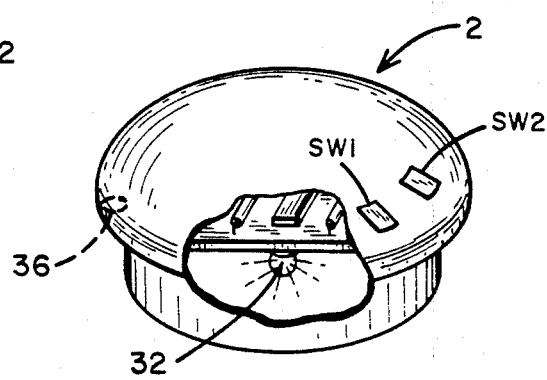

Referring now to FIGS. 2b and 2c, an elevation and perspective view are shown of a GID 2 constructed in accordance with the present invention. Generally, it comprises a multi-tiered, hand compatible structure that is preferably fabricated from a polysulfone plastic since polysulfane is transparent to infrared. The lower tier of the housing 30 is formed as a cylindrical member 31 and it contains an omnidirectional or 360° radiating infrared light source 32. Overlying the cylindrical housing 30 is a cap member 34 and which is hemispherically formed so as to easily and comfortably cup within the hand, although any other suitable palm-fitting shape would be equally as advantageous. Contained within the cap member 34 are one or more rechargable batteries and the circuitry necessary for controlling the pulse rate or duty cycle of the pulse generator that drives the infrared light source 32. This circuitry will be, however, described in detail hereinafter.

A plurality of recessed switches, SW1 and SW2 are also mounted on the top of the cap housing 34 and are operator accessible for controlling the duty cycle at which the infrared source 32 is pulsed. Also provided on the housing 34 are the battery recharging terminals 36 which are mounted so as not to be readily accessible during normal use, but which permit the recharging of the batteries when the GID 2 is not being used.

Directing attention next to FIGS. 3a, 3b, and 3c, a number of figures are shown and whereby the geometry of the present system will be explained and relative to which the onboard microprocessor in the detector 4 and which calculates the X, Y Cartesian coordinates for the movable GID 2. In particular and from FIG. 3a, a plan view is shown of the detector 4 relative to the right and left guide/sensors 16 and 18 and the point light source 32. From FIG. 3a, it is to be noted that as the light pases through the slits 6, which are a distance D apart, it impinges upon the right and left light guides 20, and angles A and B are formed between the planes of light and the face of the detector 4. If, therefore, the distance from, say, for example, the leftmost slit 6 to a perpendicular to the longitudinal axis of the detector module 4 from the light source 32, is X, then the perpendicular distance from the source 32 to the face of the module 4 is Y. Next, by employing simple geometric identities, the unknown value of Y can be calculated relative to the unknown value of X. In particular, these identities (and which hold for all positions of the GID 2) are shown in FIG. 3b and where the the value D is determined from the measurable or known constant spacing between the left and right optical slits 6. The values of the tangents for the angles A and B, on the other hand, can be determined from the magnitude of the analog signals generated by the CCD sensors 23. Thus, once X is determined, Y follows.

Relative to the determination of the tangents Tan A and Tan B and referring to FIG. 3c, it is to be recognized that a unique analog value is associated with the amount of sensed light for any plane of light striking the windows 26 and 24. Because, too, the slope of the upper triangular window 26 is known, the circuitry can be calibrated relative to the sensed analog values at the guide/sensors 16 and 18 and from which the values for the tangents of angles A and B can be determined by the onboard microprocessor. From FIG. 3c, it should also be noted that the boundaries C through F are shown relative to the reference windows 24 and which, as previously mentioned, correlate with an imaginary square eight inches by eight inches in front of the detector module 4. Also, while the boundaries C through F correlate with the X axis, because the X boundaries are related to the Y axis (reference FIG. 3b), correspondingly the Y axis boundaries can be calculated and which for the present embodiment will be separated by the same distance as the X axis boundaries, thus forming a square. It should be noted, too, that the mentioned four inch separation relative to the front of the Y axis boundary from the detector module 4 is determined by placing the GID 2 at the midpoint of the detector 4 and the light from which at that point passes through the slit 6 so as to impinge the boundaries C and F, while at its opposite extreme, the light impinges the boundaries D and E.

Referring now to FIG. 4, a generalized schematic diagram is shown of the circuitry on the printed circuit board 28. Before discussing the details thereof, however, it is to be recognized that while the CCD sensors 23 have been described as singular entities, they in fact are each electrically subdivided into two principal regions correlating with the windows 26 and 24. Because, too, the reference portion of each sensor 23 determines the pair of the X and Y boundaries, for convenience the sensors 23 will hereafter be referred to by side relative to their outputs as they relate to the windows 26 and 24 and the boundaries C through F. Thus, the A side CCD sensor 23 will have a "sensor A" output correlating with the window 26 at the guide/sensor 18 and a "reference sensor A" output correlating with the associated reference window 24. Similarly, the side B CCD sensor 23 will have a "sensor B" and "reference sensor B" output. Also, the presence of light at the boundaries of the CCD sensors 23 are shown as "sensors C to F", inclusive. With the latter sensors C to F in mind and referring to FIG. 3a, it is to be noted that if light is sensed at any of the boundaries C to F, an output is produced and coupled via the corresponding sensor to one or more of the buffers 50, 52, 54 and 56 before being coupled to logic OR gate 58 and thence to the microprocessor 60. Also, should light not be detected at one or the other of sensors A or B, the microprocesor 60 will in response to these detected signals generate an error or "out-of-range" code that will be transmitted to the computer 8 and thence to the operator via the display 10.

Typically, though, position dependent (within bounds) analog signals are detected at each of the halves of the sensors 23 for the sides A and B. Depending upon the intensity of the signal detected, the sensors 23 produce analog signals of corresponding levels and which for side A are coupled to operational amplifier 62, while for side B, they are coupled to operational amplifier 64. The operational amplifiers, then, subtract out the reference level of the detected signals, before the resultant signals are coupled to multiplexer 66. Under control of the microprocessor 60, the analog values are then sequentially selected via the select line 68 and coupled to the analog-digital convertor 70, whereat a 12-bit digital code representative of the position dependent analog data is generated. These digital values are then sequentially operated upon by the microprocessor 60 so as to generate the appropriate tangents for the angles A and B. Upon determining the tangent values, the microprocessor 60 then calculates the X and Y Cartesian coordinate values and transmits them to the computer 8 via a universal asynchronous receiver/transmitter, RS 232 driver 72 upon command from the computer 8.

At the same time that the coordinate data is transmitted to the computer 8, a bit indicative of the condition of OR gate 58, and three bits indicative an operator selected duty cycle detect signal are also transmitted to the computer 8. Relative to the later duty cycle detect signal, it is indicative of the settings of the switches SW1, SW2 and SW3 that are mounted in the top of the GID 2. As mentioned, these switches control the duty cycle of the light source 32 (i.e. its on-time relative to its off-time) and thus may be detected via either of the reference windows 24 for sensors A and B, since they are both pulsed at the same rate. For the circuitry of FIG. 4, the duty cycle is detected at the reference window 24 of the side B sensor 23. Thus, as the analog reference value is coupled to the operational amplifier 64, it is also coupled to buffer 74 and thence to the duty cycle detect circuitry 76. There the rate of the pulsed input is sampled via a clock controlled counter and the three-bit digital output is produced that is coupled to the computer 8. This duty cycle information is analyzed by the computer 8 and functionally determines the manner in which the associated coordinate information is utilized, (e.g. it may be used to move a cursor on the display 10 or to call up desired information from the backing store of the computer 8, or to perform any other function previously programmed into the computer).

Figure 5A:
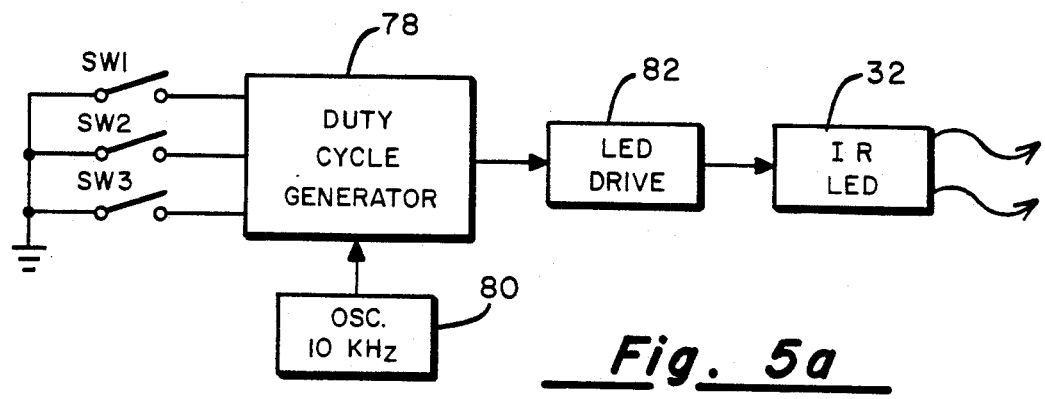
FIG. 5a shows a block diagram of the control circuitry contained with the movable, cordless mouse.
Figure 5B:
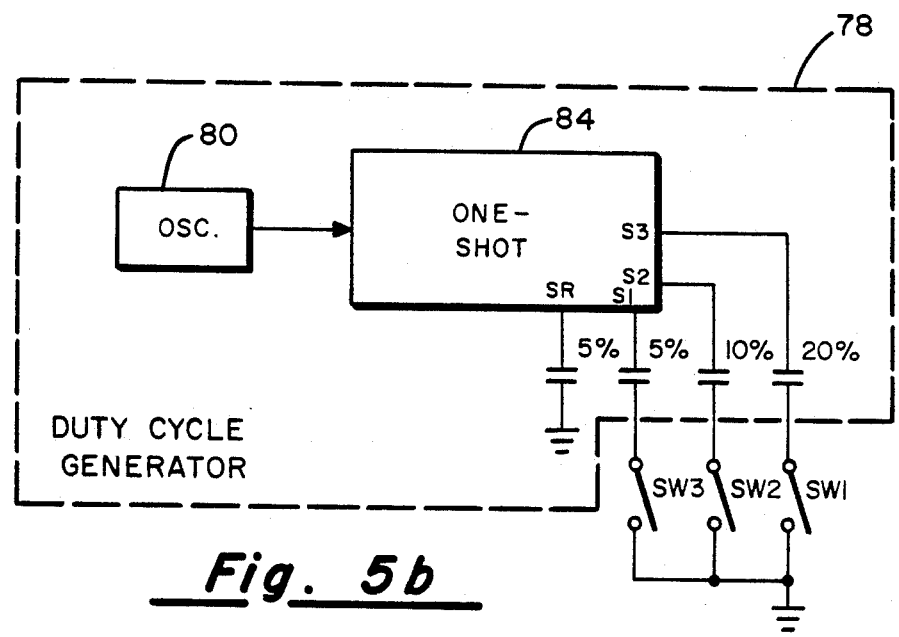
FIG. 5b shows a diagram of the duty cycle control generator contained within the cordless mouse.

Directing attention next to FIGS. 5a and 5b, block diagrams are shown of the circuitry contained within the movable, cordless GID 2. In particular and from FIG. 5a, it is to be noted that the switch inputs from the switches SW1, SW2 and SW3 are coupled to the duty cycle generator 78, so as to produce an appropriate pulse stream in relation to the 10 kilohertz oscillator 80 and cause the LED driver 82 to pulse the infrared LED source 32.

The specific rate at which the LED drive 82 is driven is determined via the period controlled one-shot multivibrator 84 of FIG. 5b. In particular, the period of the multivibrator 84 is operator controlled via the switches SW1, SW2 and SW3 and which couple different percentage value capacitors (i.e. from 5 to 40 percent) to the multivibrator inputs 51, 52 and 53. The specific switch closures and corresponding percentages of on time for the thus generated duty cycles can be more particularly seen upon reference to Table 1 below:

TABLE 1

| Duty Cycle (% On Time) | SW1 | SW2 | SW3 |
|---|---|---|---|
| 5 | 0 | 0 | 0 |
| 10 | 0 | 0 | 1 |
| 15 | 0 | 1 | 0 |
| 20 | 0 | 1 | 1 |
| 25 | 1 | 0 | 0 |
| 30 | 1 | 0 | 1 |
| 35 | 1 | 1 | 0 |
| 40 | 1 | 1 | 1 |

Figure 5C:
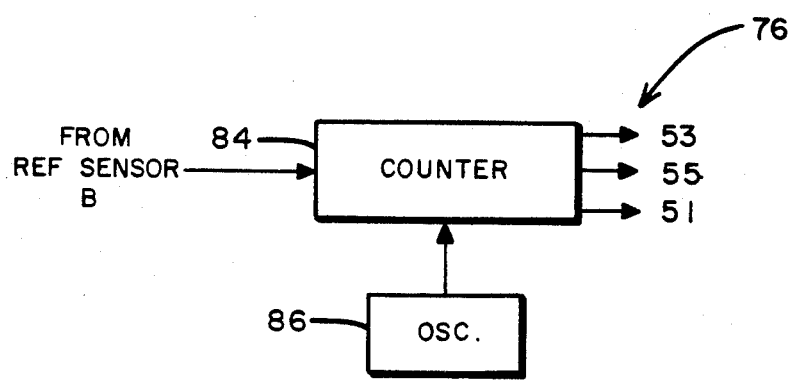
FIG. 5c shows a block diagram of the duty cycle detect circuitry.

As mentioned, the selected duty cycle is subsequently decoded in the detector 4 via the duty cycle detect circuitry 76 of FIG. 4. A more detailed schematic of the circuitry 76 is shown in FIG. 5c and which is comprised of a counter 84 and oscillator 86. In operation, the counter 84 counts the pulses of light sensed at the reference B sensor relative to the output of oscillator 86. The oscillator 86 output, in turn, periodically clocks the count into the microprocessor 60 and thus the circuitry 76 demodulates the input into digital values indicative of the duty cycle set at switches SW1, SW2 and SW3.

Figure 6:
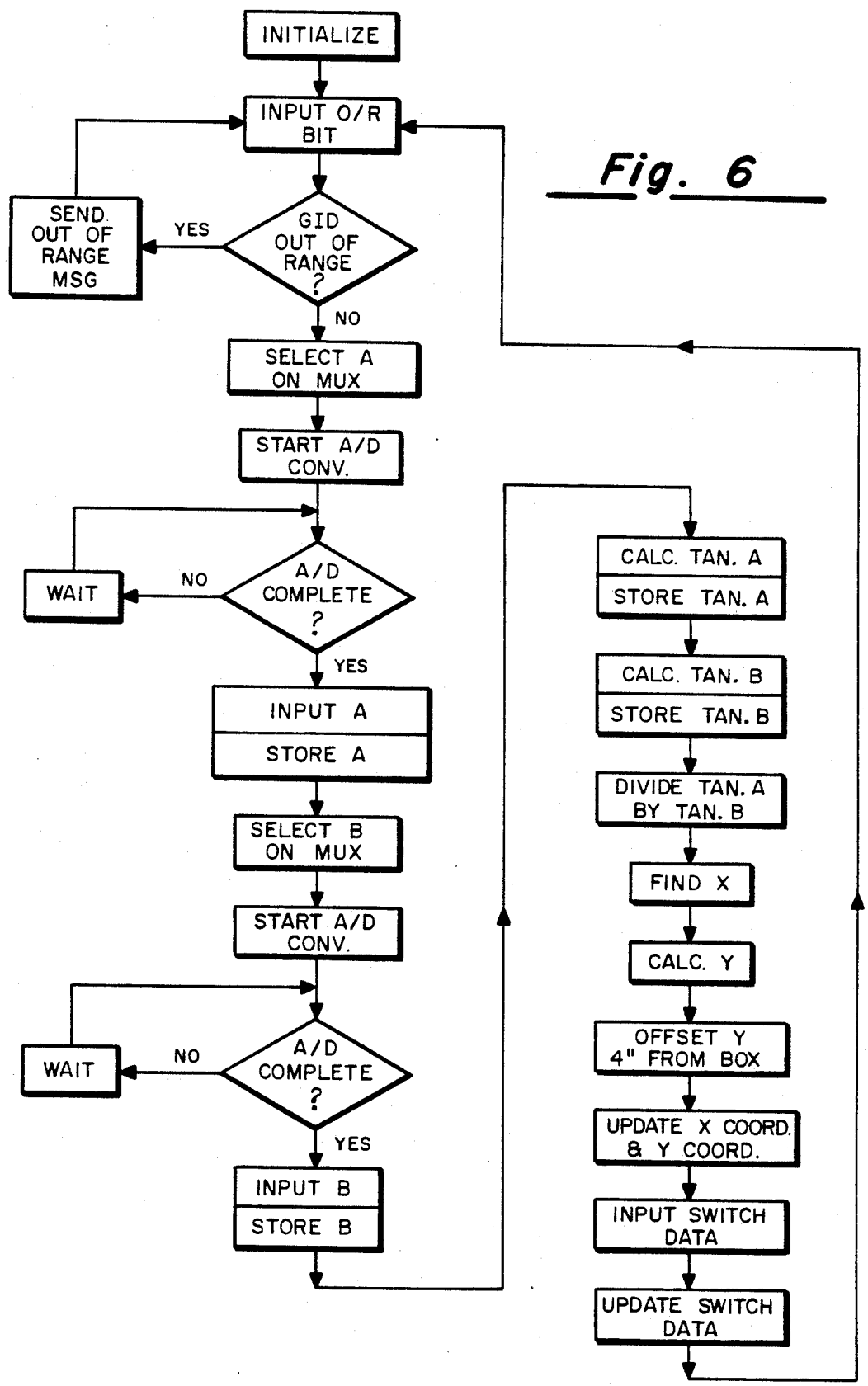
FIG. 6 shows a generalized flow chart of the processing that occurs in the detector's microprocessor as it calculates the mouse's coordinates.

Referring now to FIG. 6, a flow chart is shown of microprocessor 60's microprogram and which is stored in a read only memory (ROM) in the detector module 4. Generally, it causes the microprocessor 60 to monitor the sensors A through F and generate and transmit the out-of-range bit, the 12 bit, X and Y coordinate data, and the three bit duty cycle data. More particularly, though, and upon initializing the system after power-up, it causes the microprocessor 60 to clear its registers and begin by monitoring the output of OR gate 58 to determine its logic state and whether or not one or more of the sensors A to F is indicating that the GID 2 is out-of-range. If the GID 2 is out-of-range, the microprocessor 60 couples the mentioned "out-of-range" error signal to the computer 8 and display 10 so as to advise the operator to move the GID 2 back into range. Assuming, however, that the GID 2 is in range, the microprocessor 60 next selects the A port of multiplexer 66 and converts the analog data from sensor A into to a digital word via the analog-to-digital convertor 70. Upon completing the conversion, the associated 12 bits of data are stored in an internal arithmetic register of the microprocessor 60.

The microprocessor 60 next selects the B-port of the multiplexer 60 and the B sensor analog data and which, too, is converted to a digital word and stored in a second arithmetic register in the microprocessor 60. The microprocessor 60 next performs a table look-up operation for each of the stored digitized inputs to determine the respective tangents of the angles A and B, prior to completing the calculation of X via the equation of FIG. 3b.

Upon calculating X, the microprocessor 60 next calculates Y by multiplying X by the tangent of the angle A. Then, because the calculated Y coordinate includes the offset or distance from the base of the triangle, including angles A and B, to the Y boundary closest to the detector 4, it is necessary to substract this offset valve from the calculated value of the Y coordinate. Upon subtracting the offset from the calculated value of Y, the true Y coordinate is stored along with the previously calculated X coordinate.

The microprocessor 60 next monitors the duty cycle detect lircuitry output ports 51, 52, and 53 to determine the state of the recessed switches SW1, SW2 and SW3 and couples the associated three bits to the previously stored 25 bits, before transmitting the 28 bits of data to the computer 8. There the associated fields of the data are separated and monitored by the computer 8. In the same fashion, once each five milliseconds, the X, Y coordinate information is therefore updated and made available to the computer 8 so as to maintain a real time link with the display 10.

The present cordless graphics input device 2 and system thus permits the operator to monitor the GID 2 movement on any surface without having to worry about cords or the position of the GID 2 relative to the detector 4. In the latter regard, too, and since light source 32 is omnidirectional, the GID 2 may also be rotated during use without causing an unintended diagonal movement of the cursor on the CRT screen.

While the present invention has been described with respect to its presently preferred embodiment, it is to be recognized that various additional modifications may be made thereto by those of skill in the art without departing from the spirit and scope of the basic invention of a cordless mouse. It is, therefore, contemplated that the following claims shall be interpreted so as to include all those equivalent embodiments within the spirit and scope of the presently described and claimed invention.

What is claimed is:

1. A photo-optic sensor system for producing positional data relative to the location of a point light source comprising:
   a hand positionable omnidirectional point light source;
   an opaque screen having first and second optically transparent slits formed therethrough at spaced-apart location which first and second planes of light may pass;
   first and second light guides mounted in the respective paths of said first and second light planes, each having an opaque mask thereon defining a plurality of patterned openings upon which said planes of light impinge;
   first and second sensor means coupled to said respective first and second light guides for producing at least a reference output and a positionally proportional output relative to said point light source; and
   processing means responsive to said reference and positionally proportional outputs for producing the Cartesian coordinates of said point light source.

2. Apparatus as set forth in claim 1 wherein said point light source includes means for selectively controlling the duty cycle of said point light source.

3. Apparatus as set forth in claim 2 wherein said processing means include means for decoding the duty cycle of said point light source and producing an output indicative thereof.

4. Apparatus as set forth in claim 1 wherein one of said plurality of openings of said first and second light guides is of a shape complimentary to another of said plurality of openings of said first and second light guides.

5. Apparatus as set forth in claim 1 wherein one of the openings of said first and second light guides is a window of continuously changing height along a length dimension thereof.

6. Apparatus as set forth in claim 1 wherein one of the openings of said first and second light guides is a window of generally constant height.

7. Apparatus as set forth in claim 1 wherein said light guides include an opaque divider between each of said patterned openings.

8. Apparatus as set forth in claim 1 wherein said processing means includes means for determining the positional coordinates of said point light source relative to one another and the respective angles A and B formed therewith as said respective first and second light planes impinge upon said first and second light guides.

9. Apparatus as set forth in claim 8 wherein said processing means includes means for determining X, where $$X = \frac{D}{\left(\frac{TAN\,A}{TAN\,B} + 1\right)}$$

and where D is the distance between said first and second slits.

10. Apparatus as set forth in claim 9 including means for determining Y, where Y=X TAN A or Y=TAN B (D-X).

11. Apparatus as set forth in claim 1 including means for ensuring that said point light source is in range, before said processing means determines the coordinate position of said point light source.

12. Apparatus as set forth in claim 1 wherein said point light source is manipulatable upon any surface relative to said detector so long as said light impinges upon said patterned openings on said first and second light guides and sensors.

13. A sensor system for producing positional coordinate data comprising:
   a cordless hand movable light source;
   a detector module having an opaque screen and at least two parallel and spaced-apart transparent slits formed therein and through which planes of light from said source may pass, sensor means disposed behind said slits for detecting the intensities of the respective light planes relative to a reference and means responsive to each of said detected intensities for determining the angle of incidence of said light planes, whereby the positional coordinates of said light source relative to said detector module are determined.

* * * * *